(12) United States Patent
Azechi et al.

(10) Patent No.: US 6,331,588 B1
(45) Date of Patent: Dec. 18, 2001

(54) ADDITION CURING TYPE LIQUID SILICONE RUBBER COMPOSITIONS

(75) Inventors: Syuuichi Azechi; Yujiro Taira; Takeo Yoshida, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/588,900

(22) Filed: Jun. 9, 2000

(30) Foreign Application Priority Data

Jun. 9, 1999 (JP) .................................................. 11-163109

(51) Int. Cl.$^7$ .................................................. C08K 5/5415
(52) U.S. Cl. ........................... 524/493; 524/588; 528/15; 528/32; 528/31; 523/209; 525/478
(58) Field of Search ..................................... 524/493, 588; 528/15, 32, 31; 523/209; 525/478

(56) References Cited

U.S. PATENT DOCUMENTS

| | | |
|---|---|---|
| 5,013,772 | 5/1991 | Fujiki et al. . |
| 6,121,368 | * 9/2000 | Heying et al. . |
| 6,187,890 | * 2/2001 | Fehn et al. . |

* cited by examiner

*Primary Examiner*—Robert Dawson
*Assistant Examiner*—Kim-Liang Peng
(74) *Attorney, Agent, or Firm*—Birch, Stewart, Kolasch & Birch, LLP

(57) ABSTRACT

A liquid addition curing type silicone rubber composition comprising (A) an addition curing type organopolysiloxane component and (B) reinforcing silica fines having a specific surface area of 50–600 m$^2$/g and surface treated with an organosilicon compound so as to bear 3–20% by weight of carbon on their surfaces prevents thickening after mixing and has an extended pot life.

7 Claims, No Drawings

ADDITION CURING TYPE LIQUID SILICONE RUBBER COMPOSITIONS

This invention relates to addition curing type liquid silicone rubber compositions which prevent thickening after mixing, have an extended pot life, and are especially suited for injection molding.

BACKGROUND OF THE INVENTION

In the prior art, addition curing type silicone rubber compositions are typically molded by press molding, transfer molding, and injection molding techniques. Under the current demand for cost reduction and mass production, it is desired to increase the cure rate of rubber to shorten the molding cycle. In the case of addition curing, however, the cure rate is increased at the sacrifice of a pot life. A silicone rubber composition is prepared by admixing its components. No problems arise if the silicone rubber composition is molded immediately after admixing. However, if the molding machine is stopped and kept quiescent for a long period of time, the composition will thicken during that period. When the molding machine is operated again, clogging or gelation can occur due to thickening or a short pot life before the composition reaches the mold, causing detrimental effects on molded parts.

To impart physical properties such as strength and durability to silicone rubber, the blending of reinforcing silica is requisite. In the application where transparent parts are necessary, large amounts of reinforcing silica must sometimes be blended in order to provide a high hardness. After blending, the silica starts to agglomerate with the lapse of time, causing thickening. In the case of an addition curing type silicone rubber composition comprising a base oil, a crosslinking component (organohydrogenpolysiloxane) and an addition reaction catalyst, the silica blended gives rise to the problem of a short pot life. There is a desire to overcome these problems.

SUMMARY OF THE INVENTION

An object of the invention is to provide an addition curing type liquid silicone rubber composition comprising an addition curing type organopolysiloxane component and reinforcing silica fines, which is prevented from thickening after mixing and has an extended pot life.

It has been found that by blending an addition curing type organopolysiloxane component with reinforcing silica fines which have been surface treated with an organosilicon compound in the form of a hydrolyzable group-containing monomer or a partial hydrolyzate thereof so as to bear at least 3% by weight of carbon on their surfaces, there is obtained a liquid addition curing type silicone rubber composition which is prevented from thickening after mixing and has an extended pot life even when the cure rate is increased. Over a long period of time, the composition has little or no detrimental effects on the line through which unvulcanized rubber is fed to a molding machine or on molded parts.

Accordingly, the invention provides an addition curing type liquid silicone rubber composition comprising (A) an addition curing type organopolysiloxane component, and (B) reinforcing silica fines having a specific surface area of at least 50 m²/g as measured by the BET method and surface treated with an organosilicon compound such that the content of carbon borne on the surface may be at least 3% by weight. In one preferred embodiment, the organosilicon compound with which the reinforcing silica fines are surface treated is a monomer having a hydrolyzable group capable of covering surfaces of the silica fines with $(CH_3)_n$—Si— groups wherein n is an integer of 1 to 3, or a partial hydrolyzate thereof and more preferably an organosilazane. While the composition is prepared by admixing component (B) with component (A) or an alkenyl group-containing organopolysiloxane in component (A), preferably component (B) is further treated with a second surface treating agent at the same time as this admixing.

According to the invention, the use of reinforcing silica fines having a surface carbon content of at least 3% by weight and hence, a high degree of hydrophobicity provides the liquid addition curing type silicone rubber composition in an uncured or unvulcanized state with a substantially extended pot life at room temperature. The composition is especially suited for injection molding.

DESCRIPTION OF THE PREFERRED EMBODIMENT

The addition curing type organopolysiloxane component (A) used in the composition of the invention is preferably one primarily comprising (a) an organopolysiloxane containing on the average at least two alkenyl groups in a molecule, represented by the following average compositional formula (1):

$$R^1{}_a SiO_{(4-a)/2} \tag{1}$$

wherein $R^1$ is a substituted or unsubstituted monovalent hydrocarbon group of 1 to 12 carbon atoms, 0.01 to 20 mol % of $R^1$ being alkenyl, and a is a positive number of 1.5 to 2.8, (b) an organohydrogenpolysiloxane containing at least two hydrogen atoms each attached to a silicon atom in a molecule, represented by the following average compositional formula (2):

$$R^2{}_b H_c SiO_{(4-b-c)/2} \tag{2}$$

wherein $R^2$ is a substituted or unsubstituted monovalent hydrocarbon group of 1 to 10 carbon atoms, b is a positive number of 0.7 to 2.1, c is a positive number of 0.002 to 1, and b+c is 0.8 to 3, and (c) a catalytic amount of an addition reaction catalyst.

The alkenyl group-containing organopolysiloxane of formula (1) is a base polymer of the addition curing type organopolysiloxane component (A). $R^1$ stands for substituted or unsubstituted monovalent hydrocarbon groups of 1 to 12 carbon atoms, preferably 1 to 8 carbon atoms, for example, alkyl groups such as methyl, ethyl, propyl, isopropyl, butyl, isobutyl, tert-butyl, pentyl, neopentyl, hexyl, cyclohexyl, octyl, nonyl and decyl; alkenyl groups such as vinyl, allyl, propenyl, isopropenyl, butenyl, isobutenyl, hexenyl, cyclohexenyl and octenyl; aryl groups such as phenyl, tolyl, xylyl and naphthyl; aralkyl groups such as benzyl, phenylethyl and phenylpropyl; and halo- or cyano-substituted hydrocarbon groups such as chloromethyl, bromoethyl, 3,3,3-trifluoropropyl, 3-chloropropyl and cyanoethyl. The $R^1$ groups may be the same or different. Alkenyl groups should preferably account for 0.01 to 20 mol % (i.e., 0.0001 to 0.2), and more preferably 0.1 to 10 mol % (i.e., 0.001 to 0.1) of the entire organic groups (i.e., $R^1$ groups). The organopolysiloxane should contain on the average at least two alkenyl groups. Although $R^1$ may be any of the foregoing groups, it is preferred to introduce vinyl as the alkenyl group, and methyl, phenyl and 3,3,3-trifluoropropyl as the other substituent group. Letter a is a positive number of 1.3 to 2.8, preferably 1.8 to 2.5, and more preferably 1.95 to 2.05.

The molecular structure of the organopolysiloxane of formula (1) may be a straight chain or a branched structure containing $R^1SiO_{3/2}$ and/or $SiO_{4/2}$ units. Typical is a linear diorganopolysiloxane having a backbone consisting essentially of recurring diorganosiloxane units: $R^1_2SiO_{2/2}$ and blocked with a triorganosiloxy unit: $R^1_3SiO_{1/2}$ at each end of its molecular chain. The alkenyl groups in the molecule may be attached to either or both of the silicon atoms at the end and intermediate of the molecular chain. It is preferred from the standpoints of curability and cured physical properties that the organopolysiloxane have at least alkenyl groups attached to the silicon atoms at both ends of the molecular chain.

The alkenyl group-containing organopolysiloxane of formula (1) desirably has a viscosity of 100 to 1,000,000 centipoise at 25° C., and especially 500 to 500,000 centipoise at 25° C.

The alkenyl group-containing organopolysiloxane can be prepared by any well-known method, for example, by effecting equilibration reaction between a cyclic and/or linear organopolysiloxane and a hexaorganodisiloxane in the presence of an alkali or acid catalyst.

In formula (2) representing the organohydrogenpolysiloxane, $R^2$ is as defined for $R^1$ and preferably free of aliphatic unsaturation, with methyl, phenyl and 3,3,3-trifluoropropyl being especially preferred. Letter b is a positive number of 0.7 to 2.1, preferably 1 to 2, c is a positive number of 0.002 to 1, preferably 0.01 to 1, and b+c is 0.8 to 3, preferably 1.5 to 2.8.

The organohydrogenpolysiloxane serves as a crosslinking agent for the base polymer (a) in the presence of an addition reaction catalyst. It should contain on the average at least two, preferably at least three hydrogen atoms each attached to a silicon atom (i.e., SiH groups) in a molecule. The SiH groups may be located either at the end or intermediate of the molecular chain or both. Illustrative examples of the organohydrogenpolysiloxane include 1,1,3,3-tetramethyldisiloxane, methylhydrogen cyclic polysiloxane, methylhydrogensiloxane-dimethylsiloxane cyclic copolymers, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane-dimethylsiloxane copolymers, both end dimethylhydrogensiloxy-blocked dimethylhydrogensiloxane-diphenylsiloxane-dimethylsiloxane copolymers, copolymers of $(CH_3)_2HSiO_{1/2}$ units and $SiO_{4/2}$ units, copolymers of $(CH_3)_2HSiO_{1/2}$ units, $SiO_{4/2}$ units and $(C_6H_5)SiO_{3/2}$ units, and copolymers of $(CH_3)_2HSiO_{1/2}$ units, $(CH_3)_3SiO_{1/2}$ units and $SiO_{4/2}$ units.

The organohydrogenpolysiloxane of formula (2) may have a straight, cyclic or branched molecular structure or three-dimensional network structure. Its molecular weight is not critical although it is preferably liquid at room temperature. It preferably has a viscosity of 0.1 to 10,000 centipoise at 25° C., especially 0.5 to 5,000 centipoise at 25° C. The number of SiH groups per molecule is preferably about 2.01 to 300, and especially about 2.5 to 100 on the average.

The organohydrogenpolysiloxane can be prepared by well-known methods.

An appropriate amount of the organohydrogenpolysiloxane blended is about 0.1 to 300 parts, preferably about 0.3 to 200 parts, and especially about 0.5 to 100 parts by weight per 100 parts by weight of the alkenyl-containing organopolysiloxane (a). Differently stated, the organohydrogenpolysiloxane is preferably used in such amounts that the molar ratio of silicon-bonded hydrogen atoms (i.e., SiH groups) in the organohydrogenpolysiloxane to alkenyl groups in the organopolysiloxane may range from 0.3:1 to 20:1, and more preferably from 0.8:1 to 3:1.

The addition reaction catalyst (c) may be selected from among platinum catalysts such as platinum black, platinic chloride, chloroplatinic acid, reaction products of chloroplatinic acid with monohydric alcohols, complexes of chloroplatinic acid with olefins or vinylsiloxanes, platinum bisacetoacetate, palladium catalysts, rhodium catalysts, etc. The addition reaction catalyst may be used in a catalytic amount. A desirable amount is 0.1 to 1,000 ppm, and especially 1 to 300 ppm of platinum, palladium or rhodium metal based on the alkenyl-containing organopolysiloxane (a).

In the above-described addition curing type organopolysiloxane component (A), basically silica fines and other inorganic fillers are not blended. Besides the above-mentioned main components (a), (b) and (c), optional components may be added insofar as the benefits of the invention are not impaired. Such optional components include addition reaction controlling agents, for example, vinyl-containing organopolysiloxanes such as vinylcyclotetrasiloxane, triallyl isocyanurate, alkyl maleates, acetylene alcohols such as ethynyl cyclohexanol, and silane and siloxane-modified products thereof, hydroperoxides, tetramethylethylenediamine and benzotriazole and mixtures thereof.

The reinforcing silica fines (i.e. finely diveided reinforcing silica fillers) (B) are effective for preventing the composition from thickening due to agglomeration with the lapse of time after admixing of its components, and suppressing the phenomenon that the addition curing type organopolysiloxane component is shortened in pot life in the co-presence of the crosslinking components (organohydrogen-polysiloxane+addition reaction catalyst) and the base oil. The reinforcing silica fines used herein are characterized in that they have been surface treated with an organosilicon compound such that the content of carbon borne on the surface is at least 3% by weight. Preferably reinforcing silica fines are surface treated with a surface treating agent in the form of an organosilicon compound monomer having a hydrolyzable group or a partial hydrolyzate thereof. The surface treating agent is capable of covering surfaces of the silica fines with $(CH_3)_n$—Si— groups wherein n is an integer of 1 to 3. The type of silica subject to surface treatment is not critical, and any of silicas used in conventional silicone rubber compositions may be used. However, it is necessary that reinforcing silica fines prior to surface treatment have a specific surface area of at least 50 m²/g as measured by the BET adsorption method. It is advantageous to use precipitated silica, fumed silica and fired silica having a specific surface area of 50 to 600 m²/g, and especially 100 to 400 m²/g, with the fumed silica being especially advantageous for improved rubber strength.

In the composition of the invention, silica fines are essential as a reinforcement for rubber. If untreated silica is added as a reinforcement to the organopolysiloxane component, undesired influences including thickening due to thixotropy and pot-life shortage develop because of the presence of numerous silanol groups (Si—OH groups) on the surface of untreated silica. Therefore, silica must be treated to be hydrophobic on the surface. Silica must be surface treated so as to bear at least 3%, preferably at least 3.5% by weight of carbon (per weight of silica) on the silica surface. A surface-borne carbon content of less than 3% by weight is less effective for providing the rubber composition with anti-thickening and pot-life extension. The upper limit of carbon content is not critical although it is usually up to 20%, preferably up to 12% and more preferably up to 8% by weight.

It is recommended that silica fines be previously treated directly in powder form. Any of well-known techniques may be used for the surface treatment. For example, untreated silica fine powder and a surface treating agent are admitted into a mechanical milling device closed under atmospheric pressure or a fluidized bed where they are mixed to effect surface treatment at room temperature or elevated temperature, optionally in the presence of an inert gas. If desired, a catalyst is used to promote the surface treatment. After thorough admixing, the powder is dried. The amount of the surface treating agent used is at least the theoretical amount calculated from the surface area to be covered with the agent.

The surface treating agent used herein is preferably a compound capable of covering surfaces of silica fines with an organosilyl group having an alkyl group (methyl, etc.), an alkenyl group (vinyl, etc.), an aryl group (phenyl, etc.), especially monomethylsilyl, dimethylsilyl or trimethylsilyl groups represented by $(CH_3)_n$—Si— wherein n is an integer of 1 to 3. It is noted that in each of these silyl groups, the valence bonds on the silicon atom other than methyl are attached to the oxygen atom forming a siloxane structure represented by Si—O—Si. Illustrative examples of the surface treating agent are organosilicon compounds including organosilazanes, for example, hexaorganodisilazanes such as 1,3-divinyltetramethyldisilazane, 1,3-dimethyltetravinyldisilazane, 1,3-diphenyltetramethyldisilazane and hexamethyldisilazane, and octaorganotrisilazanes such as octamethyltrisilazane and 1,5-divinylhexamethyltrisilazane; silane coupling agents, for example, alkyltrialkoxysilanes such as methyltrimethoxysilane, ethyltrimethoxysilane, propyltrimethoxysilane, and butyltrimethoxysilane, dialkyldialkoxysilanes such as dimethyldimethoxysilane, diethyldimethoxysilane, dimethyldiethoxysilane, and diethyldiethoxysilane, alkenyltrialkoxysilanes such as vinyltriethoxysilane, vinyltrimethoxysilane, and vinyltris(methoxyethoxy)silane, dialkenyldialkoxysilanes such as divinyldimethoxysilane and divinyldiethoxysilane, trialkylalkoxysilanes such as trimethylmethoxysilane and triethylmethoxysilane, trialkenylalkoxysilanes such as trivinylmethoxysilane and trivinylethoxysilane, organochlorosilanes such as trimethylchlorosilane, dimethyldichlorosilane, methyltrichlorosilane, vinyltrichlorosilane, divinyldichlorosilane, and trivinylchlorosilane, and chloropropyltrimethoxysilane; dimethylpolysiloxane and organohydrogenpolysiloxane. Partial hydrolyzates of these compounds are also included. Of these, the organosilazanes and silane coupling agents in which the substituent attached to a silicon atom other than the hydrolyzable group is methyl are preferred, with the organosilazanes being especially preferred.

An appropriate amount of component (B) blended is 1 to 100 parts, more preferably 2 to 80 parts by weight per 100 parts by weight of component (A), especially per 100 parts by weight of the alkenyl-containing organopolysiloxane (a) in component (A). Less amounts of component (B) fail to provide mechanical strength whereas excessive amounts of component (B) are difficult to fill, aggravating working and processing efficiency.

It is recommended that when the surface treated (hydrophobic) silica fines are admixed with component (A), the silica fines be further subjected to a hydrophobic treatment. That is, a second surface treating agent is used in the admixing step for imparting additional hydrophobic property to the once hydrophobicized silica fines. Examples of the second surface treating agent include organosilicon compounds, for example, silane coupling agents and partial hydrolyzates thereof, organosilazanes, titanate coupling agents, organopolysiloxane fluids (e.g., dimethylpolysiloxane fluid), and organohydrogenpolysiloxane fluids.

The second surface treating agents used herein are described in further detail. Exemplary silane coupling agents used herein include methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, trimethylaminosilane, glycidoxypropyltrimethoxysilane, glycidoxypropylmethyldiethoxysilane, (epoxycyclohexyl)-ethyltrimethoxysilane, methacryloxypropyltrimethoxysilane, methacryloxypropyltriethoxysilane, dimethyldimethoxysilane, divinyldimethoxysilane, and chloropropyltrimethoxysilane. Other silanes are also useful. Partial hydrolyzates of these silanes are also useful.

Exemplary organosilazanes used herein are hexaorganodisilazanes such as hexamethyldisilazane, divinyltetramethyldisilazane and diphenyltetramethyldisilazane.

Exemplary titanate coupling agents used herein include tetraisopropyl titanate, tetra-n-butyl titanate, butyl titanate dimer, tetrastearyl titanate, triethanolamine titanate, titanium acetylacetonate, titanium ethylacetoacetate, titanium lactate, octylene glycol titanate, isopropyl tristearoyl titanate, isopropyl tridodecylbenzenesulfonyl titanate, isopropyl tris (dioctylpyrophosphate) titanate, bis(dioctylpyrophosphate) oxyacetate titanate, and bis(dioctylpyrophosphate) ethylene titanate.

Exemplary organopolysiloxane fluids used herein are non-functional organopolysiloxane fluids, preferably dimethylpolysiloxane fluids. Their molecular structure may be cyclic, linear, branched or network. Fluids having a viscosity of 0.65 to 100,000 centistokes at 25° C. are preferred.

The organohydrogenpolysiloxane fluids used herein may have any of cyclic, linear, branched and network molecular structures. Methylhydrogenpolysiloxanes of the following average formula (3) are desirably used.

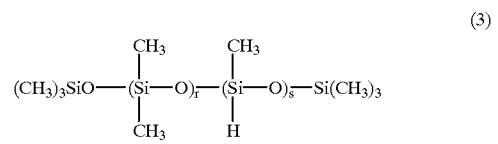

(3)

In the formula, r is an integer of 0 to 50, and s is an integer of 1 to 50. Siloxanes with r in excess of 50 are too viscous and difficult to treat therewith. Similarly, siloxanes with s in excess of 50 are too viscous and difficult to wet the surface.

The amount of the second surface treating agent used is at least the theoretical amount calculated from the surface area to be covered with the agent. Specifically, less than 0.1 parts by weight of the second agent per 100 parts by weight of the silica fines would sometimes be ineffective whereas more than 20 parts by weight of the second agent would be wasteful and adds to the cost. For this reason, 0.1 to 20 parts, especially 0.5 to 10 parts by weight of the second surface treating agent is preferably used per 100 parts by weight of the silica fines.

The second surface treatment may be effected on the silica fines as an independent step or together with the step of mixing with other components. Any of well-known techniques for surface treatment may be used. For example, the treated silica fine powder, other components and the second surface treating agent are admitted into a mechanical milling device under atmospheric pressure where they are mixed to effect surface treatment at room temperature or elevated temperature, optionally in the presence of an inert gas. If desired, a catalyst is used to promote the surface treatment.

In addition to the above-described components, various additives may be added to the silicone rubber composition of the invention. Such additives are selected for a particular purpose. Typical additives are metal oxides and compounds thereof such as titanium oxide, iron oxide, cerium oxide, vanadium oxide, cobalt oxide, chromium oxide, and manganese oxide, and inorganic fillers, for example, quartz powder, diatomaceous earth, calcium carbonate, magnesium carbonate, alumina, and carbon. Also, pigments, heat resistance modifiers, flame retardants, plasticizers, and reaction controlling agents may be added insofar as the desired properties are not impaired. These optional additives may be added in conventional amounts that would not hamper the benefits of the invention.

The silicone rubber composition of the invention can be obtained simply by uniformly admixing the above-described components (A) and (B) and optional components at room temperature. Preferably, component (B) is mixed with the entirety or a part of component (a) of component (A) and optional components in a planetary mixer or kneader where they are heat treated at a temperature of 100 to 200° C. for 1 to 4 hours, during which period the second surface treating agent may be added. Thereafter, at room temperature, the mixture is admixed with components (b) and (c) of component (A) and the remainder of component (a) if any, thereby obtaining the liquid composition. Any desired molding technique may be selected depending on the viscosity of the mixture or composition. Any of casting, extrusion molding, compression molding, transfer molding and injection molding techniques is useful. The composition of the invention is especially suited for injection molding. The composition may be heat molded, typically at a temperature of 60 to 200° C. for 10 seconds to 24 hours.

Preferably the liquid silicone rubber composition of the invention has a viscosity of up to 100,000 poise, especially up to 50,000 poise at 25° C.

EXAMPLE

Examples of the invention are given below by way of illustration and not by way of limitation. All parts are by weight.

The starting silica fines were fumed silicas S1, S2, S3 and S4 having a specific surface area (Si—OH density) prior to surface treatment. Fumed silicas S1, S2 and S3 were treated with hexamethyldisilazane and fumed silica S4 treated with dimethyldichlorosilane in a fluidized bed. The treated silicas S1 and S2 bore more than 3.0% by weight of carbon whereas the treated silicas S3 and S4 bore less than 3.0% by weight of carbon.

| Silica sample | S1 | S2 | S3 | S4 |
|---|---|---|---|---|
| Prior to treatment | | | | |
| Specific surface area (m²/g) | 300 | 200 | 300 | 300 |
| After treatment | | | | |
| Extracted water pH | 6.5 | 6.5 | 5.0 | 5.0 |
| Specific surface area (m²/g) | 190 | 130 | 170 | 180 |
| Carbon content (wt %) | 4.3 | 3.7 | 1.0 | 2.6 |

Example 1

As shown in Table 1, a dimethylpolysiloxane blocked with a dimethylvinylsiloxy group at each end and having a viscosity of 10,000 centipoise at 25° C. as component (a) of component (A) and treated silica S1 as component (B) were blended and uniformly admixed in a kneader/mixer, and further heat admixed at 150° C. for one hour, obtaining a silicone rubber base. To the silicone rubber base were added methylhydrogenpolysiloxane of the average formula (4):

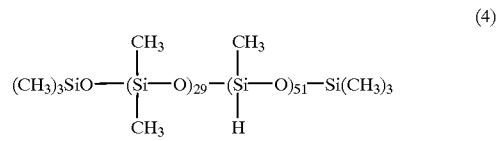

(4)

as component (b), a 1% 2-ethylhexanol solution of chloroplatinic acid as component (c), and a 50% ethanol solution of ethynyl cyclohexanol as a reaction controlling agent. They were uniformly mixed, yielding a silicone rubber composition. The composition was heat cured at 120° C. for 10 minutes into a silicone rubber sheet of 80 mm×80 mm×2 mm thick. The silicone rubber sheet was measured for hardness (A scale), elongation and tensile strength according to JIS K-6301. Also, the cure data of the composition at 150° C. was examined by means of a rheometer. Provided that the torque after 2 minutes was 100%, the time (T10 or T90) when the torque reached 10% or 90% were measured. Furthermore, the composition after mixing was allowed to stand at room temperature, during which period a change of viscosity and a pot-life were measured. The results are shown in Table 1.

Example 2

The dimethylpolysiloxane described in Example 1 as component (a) and treated silica S1 described in Example 1 as component (B) were similarly blended, to which 8 parts of hexamethyldisilazane as the second surface treating agent was added. As in Example 1, these components were uniformly admixed and then heat admixed, obtaining a silicone rubber base. To the silicone rubber base were added the remaining components described in Example 1. They were uniformly mixed at room temperature, yielding a silicone rubber composition. The composition was heat cured at 120° C. for 10 minutes into a silicone rubber sheet of 80 mm×80 mm×2 mm thick. The physical properties of this rubber sheet were measured as in Example 1. Also, the cure data of the composition at 150° C. was examined by means of a rheometer. Furthermore, the composition which was allowed to stand at room temperature after mixing were measured for a change of viscosity and a pot-life. The results are shown in Table 1.

Example 3

The dimethylpolysiloxane described in Example 1 as component (a) and treated silica S2 as component (B) were similarly blended, uniformly admixed and then heat admixed, obtaining a silicone rubber base. To the silicone rubber base were added the remaining components described in Example 1. They were uniformly mixed at room temperature, yielding a silicone rubber composition. The composition was heat cured at 120° C. for 10 minutes into a silicone rubber sheet of 80 mm×80 mm×2 mm thick. The physical properties of this rubber sheet were measured as in Example 1. Also, the cure data of the composition at 150° C. was examined by means of a rheometer. Furthermore, the composition which was allowed to stand at room temperature after mixing were measured for a change of viscosity and a pot-life. The results are shown in Table 1.

Comparative Example 1

The dimethylpolysiloxane described in Example 1 as component (a) and untreated silica S1 (i.e., carbon content 0% by weight) as component (B) were similarly blended, to which 8 parts of hexamethyldisilazane was added. As in Example 1, these components were uniformly admixed and then heat admixed, obtaining a silicone rubber base. To the silicone rubber base were added the remaining components described in Example 1. They were uniformly mixed at room temperature, yielding a silicone rubber composition. The composition was heat cured at 120° C. for 10 minutes into a silicone rubber sheet of 80 mm×80 mm×2 mm thick. The physical properties of this rubber sheet were measured as in Example 1. Also, the cure data of the composition at 150° C. was examined by means of a rheometer. Furthermore, the composition which was allowed to stand at room temperature after mixing were measured for a change of viscosity and a pot-life. The results are shown in Table 1.

Comparative Example 2

The dimethylpolysiloxane described in Example 1 as component (a) and treated silica S3 as component (B) were similarly blended, uniformly admixed and then heat admixed, obtaining a silicone rubber base. To the silicone rubber base were added the remaining components described in Example 1. They were uniformly mixed at room temperature, yielding a silicone rubber composition. The composition was heat cured at 120° C. for 10 minutes into a silicone rubber sheet of 80 mm×80 mm×2 mm thick. The physical properties of this rubber sheet were measured as in Example 1. Also, the cure data of the composition at 150° C. was examined by means of a rheometer. Furthermore, the composition which was allowed to stand at room temperature after mixing were measured for a change of viscosity and a pot-life. The results are shown in Table 1.

Comparative Example 3

The dimethylpolysiloxane described in Example 1 as component (a) and treated silica S4 as component (B) were similarly blended, uniformly admixed and then heat admixed, obtaining a silicone rubber base. To the silicone rubber base were added the remaining components described in Example 1. They were uniformly mixed at room temperature, yielding a silicone rubber composition. The composition was heat cured at 120° C. for 10 minutes into a silicone rubber sheet of 80 mm×80 mm×2 mm thick. The physical properties of this rubber sheet were measured as in Example 1. Also, the cure data of the composition at 150° C. was examined by means of a rheometer. Furthermore, the composition which was allowed to stand at room temperature after mixing were measured for a change of viscosity and a pot-life. The results are shown in Table 1.

Comparative Example 4

The dimethylpolysiloxane described in Example 1 as component (a) and treated silica S3 as component (B) were similarly blended, to which 8 parts of hexamethyldisilazane was added. As in Example 1, these components were uniformly admixed and then heat admixed, obtaining a silicone rubber base. To the silicone rubber base were added the remaining components described in Example 1. They were uniformly mixed at room temperature, yielding a silicone rubber composition. The composition was heat cured at 120° C. for 10 minutes into a silicone rubber sheet of 80 mm×80 mm×2 mm thick. The physical properties of this rubber sheet were measured as in Example 1. Also, the cure data of the composition at 150° C. was examined by means of a rheometer. Furthermore, the composition which was allowed to stand at room temperature after mixing were measured for a change of viscosity and a pot-life. The results are shown in Table 1.

The physical properties of the rubber sheets are shown in Table 1. Additionally, each of the compositions was allowed to stand for 10 days, following which it was injection molded at 180° C. using an injection molding machine (Arburg Co.). Moldability was evaluated by examining ease of molding and visually observing the molded parts.

Additionally, the compositions of Example 1 and Comparative Examples 2 and 3, from which the addition reaction catalyst (c) was omitted, were allowed to stand, during which period a change of viscosity was examined. The results are shown in Table 2.

The change of viscosity and pot-life were measured under the following conditions.

Viscosity change:

A silicone rubber composition mixed at room temperature was held at 25° C. while a viscosity was measured at intervals by a rotating viscometer.

Pot-life:

The pot-life is the time (days) for which a silicone rubber composition mixed at room temperature was held at 25° C. until it gelled.

TABLE 1

| Component (pbw) | Example 1 | Example 2 | Example 3 | Comparative Example 1 | Comparative Example 2 | Comparative Example 3 | Comparative Example 4 |
| --- | --- | --- | --- | --- | --- | --- | --- |
| (A)(a) organopolysiloxane | 100 | 100 | 100 | 100 | 100 | 100 | 100 |
| (A)(b) organo hydrogen polysiloxane | 5 | 5 | 5 | 5 | 5 | 5 | 5 |
| (A)(c) platinum catalyst | 0.1 | 0.1 | 0.1 | 0.1 | 0.1 | 0.1 | 0.1 |
| Reaction controlling agent | 0.05 | 0.05 | 0.05 | 0.05 | 0.05 | 0.05 | 0.05 |

TABLE 1-continued

| Component (pbw) | Example 1 | Example 2 | Example 3 | Comparative Example 1 | Comparative Example 2 | Comparative Example 3 | Comparative Example 4 |
|---|---|---|---|---|---|---|---|
| (B) treated silica S1 | 40 | 40 | | | | | |
| (B) treated silica S2 | | | 40 | | | | |
| (B) treated silica S3 | | | | | 40 | | 40 |
| (B) treated silica S4 | | | | | | 40 | |
| (B) untreated silica S1 | | | | 40 | | | |
| Second treating agent (hexa-organodisilazane) during base polymer blending | nil | added | nil | added | nil | nil | added |
| Cure @ 150° C. (sec) | | | | | | | |
| T10 | 15 | 15 | 15 | 15 | 15 | 15 | 15 |
| T90 | 30 | 30 | 30 | 30 | 30 | 30 | 30 |
| Rubber physical properties | | | | | | | |
| Hardness (JIS K-6301) | 40 | 39 | 41 | 41 | 44 | 43 | 42 |
| Elongation (%) | 500 | 480 | 520 | 460 | 450 | 490 | 460 |
| Tensile strength (kgf/cm$^2$) | 70 | 69 | 65 | 71 | 72 | 69 | 70 |
| Viscosity change after mixing (poise) | | | | | | | |
| Initial | 3500 | 3300 | 3000 | 7000 | 8000 | 7700 | 5000 |
| 5 days | 10000 | 6000 | 8000 | >120000 | >120000 | >120000 | >120000 |
| 10 days | 50000 | 20000 | 40000 | — | — | — | — |
| Pot-life (day) | 30 | 40 | 29 | 8 | 8 | 9 | 11 |
| Moldability after 10 day aging | Good | Good | Good | Poor, gelled | Poor, gelled | Poor, gelled | Poor, half-gelled |

TABLE 2

| Viscosity change with time in the absence of catalyst (c), poise | Example 1 | Comparative Example 2 | Comparative Example 3 |
|---|---|---|---|
| Initial | 3500 | 8000 | 7700 |
| 5 days | 4000 | 9000 | 8500 |
| 10 days | 4500 | 10000 | 9000 |
| 15 days | 5500 | 11000 | 10000 |
| 20 days | 6000 | 13000 | 11000 |

As is evident from Table 2, where the addition reaction catalyst (c) is absent, even the compositions filled with reinforcing silica fines used in Comparative Examples undergo a relatively small change of viscosity and remain stable during storage. As seen from Table 1 which shows the data of the finally mixed compositions in which the addition reaction catalyst is present, only the silicone rubber compositions of Examples undergo a suppressed change of viscosity with time even when the cure time (molding time) is reduced in order to shorten the molding cycle, and have an extended pot-life. The molding test of the compositions of Examples after 10 days of aging from mixing shows that they can be effectively molded. This means that even when the molding machine charged with the mixed compositions of Examples is operated after a long quiescent period, the compositions have no detrimental effects on molding operation and molded parts.

There has been described a liquid addition curing type silicone rubber composition comprising an addition curing type organopolysiloxane component (including an alkenyl-containing organopolysiloxane or base polymer, an organohydrogenpolysiloxane and an addition reaction catalyst) and surface-treated reinforcing silica fines, which is prevented from thickening after mixing of the components and has an extended pot life even when the cure time is shortened for the purpose of cost reduction or mass production. Over a long period of time, the composition has little or no detrimental effects on the line through which unvulcanized rubber is fed to a molding machine or on molded parts.

Japanese Patent Application No. 11-163109 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An addition curing type liquid silicone rubber composition comprising
    (A) an addition curing type organopolysiloxane component, and
    (B) reinforcing silica fines having a specific surface area of at least 50 m$^2$/g as measured by the BET method and surface treated with an organosilicon compound such that the content of carbon on the surface is at least 3% by weight.

2. The composition of claim 1 wherein the addition curing type organopolysiloxane component (A) primarily comprises (a) an organopolysiloxane containing on the average at least two alkenyl groups in a molecule, represented by the following average compositional formula (1):

  (1)

wherein $R^1$ is a substituted or unsubstituted monovalent hydrocarbon group of 1 to 12 carbon atoms, 0.01 to 20 mol % of $R^1$ being alkenyl, and a is a positive number of 1.5 to 2.8, (b) an organohydrogenpolysiloxane containing at least two hydrogen atoms each attached to a silicon atom in a molecule, represented by the following average compositional formula (2):

  (2)

wherein $R^2$ is a substituted or unsubstituted monovalent hydrocarbon group of 1 to 10 carbon atoms, b is a positive number of 0.7 to 2.1, c is a positive number of 0.002 to 1, and b+c is 0.8 to 3, and (c) a catalytic amount of an addition reaction catalyst.

3. The composition of claim 1 wherein in component (B), the organosilicon compound with which the reinforcing silica fines are surface treated is a monomer having a hydrolyzable group capable of covering surfaces of the silica fines with $(CH_3)_n$—Si— groups wherein n is an integer of 1 to 3, or a partial hydrolyzate thereof.

4. The composition of claim 1 wherein in component (B), the organosilicon compound with which the reinforcing silica fines are surface treated is an organosilazane.

5. The composition of claim 1 wherein 1 to 100 parts by weight of component (B) is blended per 100 parts by weight of an alkenyl group-containing organopolysiloxane in component (A).

6. The composition of claim 1 wherein component (B) is further treated with a surface treating agent when it is mixed with component (A) or an alkenyl group-containing organopolysiloxane in component (A).

7. The composition of claim 1 for use in casting, extrusion molding, compression molding, transfer molding or injection molding.

* * * * *